(12) United States Patent
Stanfield

(10) Patent No.: US 7,891,915 B2
(45) Date of Patent: Feb. 22, 2011

(54) RASP HUB FOR TIRE RETREADING MACHINE

(75) Inventor: Charles K. Stanfield, Crete, IL (US)

(73) Assignee: B&J Rocket America Inc., Middlebury, IN (US)

( * ) Notice: Subject to any disclaimer, the term of this patent is extended or adjusted under 35 U.S.C. 154(b) by 322 days.

(21) Appl. No.: 12/094,427

(22) PCT Filed: Jan. 3, 2007

(86) PCT No.: PCT/US2007/000119

§ 371 (c)(1),
(2), (4) Date: Sep. 26, 2008

(87) PCT Pub. No.: WO2007/081725

PCT Pub. Date: Jul. 19, 2007

(65) Prior Publication Data

US 2009/0185872 A1    Jul. 23, 2009

Related U.S. Application Data

(60) Provisional application No. 60/756,685, filed on Jan. 6, 2006.

(51) Int. Cl.
B23D 71/00 (2006.01)
B26D 1/00 (2006.01)

(52) U.S. Cl. .................... 407/29.12; 407/29.15; 157/13

(58) Field of Classification Search ............... 407/29.1, 407/29.12, 29.13, 29.14, 29.15; 83/664, 83/846, 665, 951; 157/13
See application file for complete search history.

(56) References Cited

U.S. PATENT DOCUMENTS

| | | | | |
|---|---|---|---|---|
| 4,019,234 A | * | 4/1977 | Jensen et al. | 407/29.12 |
| 4,021,899 A | * | 5/1977 | Jensen | 407/29.12 |
| 4,336,640 A | * | 6/1982 | Willinger | 407/29.12 |
| 4,988,326 A | | 1/1991 | Bennett | |
| 5,206,977 A | * | 5/1993 | Larin | 407/29.12 |
| 5,283,935 A | * | 2/1994 | Jensen | 407/29.12 |
| 5,301,406 A | * | 4/1994 | Pincott | 407/29.12 |
| 5,461,762 A | * | 10/1995 | Jensen | 407/29.12 |
| 6,789,982 B2 | * | 9/2004 | Stanfield | 407/29.1 |
| 2004/0047696 A1 | | 3/2004 | Stanfield | |
| 2004/0234347 A1 | | 11/2004 | Collins | |

* cited by examiner

Primary Examiner—Will Fridie, Jr.
(74) Attorney, Agent, or Firm—Thomas E. Hill; Wildman, Harrold, Allen & Dixon LLP (57) ABSTRACT

A rasp hub for use in tire retreading machines includes two side plates with mounting pins extending between the plates. Rasp blades arranged in stacks are mounted on the mounting pins. The stacks extend end-to-end circumferentially about the hub. The center portion of the mounting pins is curved so that the cut profile of the blades is convex. The blades are inclined relative to a plane perpendicular to the axis of rotation to define a cut angle. The center planes of the mounting pins intersect, preferably close to the axis of rotation of the hub, to reduce deviation of the blades from the concentricity.

12 Claims, 6 Drawing Sheets

PRIOR ART

RASP HUB FOR TIRE RETREADING MACHINE

RELATED APPLICATION

This application claims benefit under 35 U.S.C. 120 of U.S. Application No. 60/756,685 filed Jan. 6, 2006 for "RASP HUB FOR TIRE RETREADING MACHINE".

FIELD OF THE INVENTION

The present invention relates to tire retreading machines; and in particular to improvements in tire retreading machine hubs for of the type known as convex hubs.

BACKGROUND OF THE INVENTION

Tire retreading machines, commonly referred to as buffers, are used in the process of retreading tires to remove the existing tread surface from a tire, to prepare the remaining surface by cutting, and to buff the receiving surface to promote better adhesion prior to applying a new tread.

Typical tire retreading buffers include a rasp, which typically may be comprised of two mounting plates referred to as a pinside and a topside plate respectively. It is further comprised of locating or mounting pins extending between the hub mounting plates. One end of each mounting pin may be fixed to the pinside mounting plate, and the other end of each pin is received in a hole in the topside plate, which may be removed for blade replacement. The end portions of the pins received in the mounting plates are straight, but the center portions, on which the rasp blades are received, are curved for convex hubs. Cutting blades are received on the curved central portions of the mounting pins, and separating spacers are located between the blades to form stacks or "sections". The rasp assembly is driven in rotation (typically about a vertical axis) by an electrical motor. Usually, the axis of rotation of the hub is vertical, while the axis of the tire is horizontal. When the outermost portion of a rasp assembly (i.e. the cutting edges on the peripheries of the blades) come into contact with a revolving tire tread surface, the old tread is removed from the tire by means of the rasp's cutting and abrading action.

There are different types of convex hubs, which differ principally in the orientation and number of blade sections comprising the hub.

Hubs are typically comprised of five sections (wherein each section occupies a 72° circumferential segment) or six sections (wherein each section occupies a 60° segment). Thus, each section of the assembled rasps is comprised of alternate blades and spacers arranged side-by-side. Furthermore, each section of blades and spacers are angled or offset relative to a plane perpendicular to the axis of rotation of the hub to form a cut angle, so that each blade in rotation has an axial cutting swath greater than the width of the blade. The width of the cut swath depends on the cut angle.

There are two primary arrangements of adjacent sections of blades when proceeding circumferentially about the hub. One arrangement has the blades and spacers of every section inclined at an angle relative to a plane perpendicular to the axis of rotation (the "cut angle"). The blades of all stacks are generally parallel. When these sections are diagrammatically unwound or "peeled" away from the circular outer shape to form a flat plane for illustration purposes, and looking in a radial direction (i.e. inwardly toward the axis), adjacent sections form a sawtooth profile or configuration.

A second arrangement has the blades and spacers similarly angled to the radial plane with the blades being parallel; however, the blades of adjacent sections (moving circumferentially about the hub) are angled in opposite axial directions. Thus, the magnitude of the cut angles is the same, but the directions are opposed. When this configuration is unwound from cylindrical for illustration so that all cutting edges be in a single plane, adjacent sections form alternate peaks and valleys. This type of arrangement may be referred to as a "chevron" arrangement because when proceeding about the periphery of the hub, alternate peaks and valleys (i.e. left-facing and right-facing "V's") are formed. It will be observed that even though the blades of adjacent stacks face different directions, the magnitude of the cut angle of a blade remains the same for all blades. For example, the blades of all odd number stacks face in one axial direction, and blades of even numbered stacks face right in the opposite axial direction (with reference to the direction of cutting motion) relative to the radial plane (or perpendicular plane), but the cut angle is the same magnitude for all blades, though in alternate axial directions.

It is generally known that the sawtooth arrangement of blade sections provides a more aggressive cutting action. That is, more material is cut away from the tread surface in a shorter time, all other factors being equal. However, one advantage to the "chevron" arrangement is that a better texture of the tread-mounting surface is provided, and that is an important consideration in achieving reliable retreads which will stand up in use. Persons familiar with rasp blades for tire re-treading will appreciate that typically, for each cutting edge, there is a corresponding buffing edge or surface. In the past, a chevron stack formation was formed only from an even number of stacks.

There are also variations in the manner in which the blades are arranged in the hub as one looks from the side in a radial or tangential direction—i.e. toward a plane parallel to the axis of rotation, but at right angles to the line of sight. This is referred to as the "profile" of the hub. The present invention relates to a so-called "convex" hub, referring to the profile of the blades. In past arrangements of convex hubs, the blades are mounted on mounting pins curved in the center, and the blades are arranged parallel to one another along the axial direction such that the distance from the axis of rotation to the cutting edge varies for corresponding points on adjacent blades as one proceeds along the longitudinal edge direction of a blade. In the case of prior convex hubs, this distance increases progressively as one proceeds axially from the two side mounting plates of the hub toward the center of a stack, thus forming a convex cut profile. The cutting edges of the two center blades may be at the same axial distance.

A convex profile stack arrangement has one drawback in that in the stack of blades the most outwardly located blade—and the progressively inwardly located blades—are located at different radii from the axis of rotation, while the actual radius of the cutting edge all blades is the same. It will be understood by those skilled in the art that rasp blades of this type are comprised of a number of small teeth, typically arranged to alternate side of the base plate of the blade. By "small" it is meant that each tooth has a cutting edge which is generally straight and has a width in the range of about 0.050-0.080 inches. As the blade rotates, these cutting edges define a "cut profile", as that term is used herein, and which may be observed if a flat sheet of material (representing a radial plane or section of a tire) is moved toward a rotating hub.

The contact surface of a tire is curved conversely in a direction parallel to its axis of rotation to form a "crown", and in preparing the contact surface for retreading, the hub is passed with its axis perpendicular to the axis of the tire so that the convex cut profile of the hub engages the convex contact surface of the tire and moves across it with the axis of rotation of the tire and the axis of rotation of the hub substantially perpendicular. Thus, any deviation of the concentricity of the cutting profile of the blades of the hub will result is less than ideal cutting/buffing of the tire retread surface.

Thus, when the blades of a stack are all parallel and arranged in a convex cut profile at the desired cut angle, the cutting edges are not truly circular for all blades, and the deviation from true circular varies from blade-to-blade in each stack due to the convex arrangement of identical, parallel blades, and the slight inclination of blades caused by the cut angle. It is generally understood that for a uniform cutting action, the radius of curvature of the blade cutting edge is preferably centered on the axis of rotation of the hub so that the cutting profile of each blade lies along an arc centered on the axis of rotation. The differences between the radius of curvature of a blade, and a radius the cutting profile of the blade (measured at blade axis or center) is referred to herein as a deviation in concentricity.

SUMMARY OF THE INVENTION

The present invention improves the concentricity and thus the cutting operation of rasp blades mounted in stacks in a convex hub and enhances the conformance of the cutting radius of the blades to the true radius of the curvature of the cutting profile of the blade.

According to the present invention, the mounting pins for the blades (which are mounted in, and carried by the hub end plates) have a central portion for mounting the blades which is curved according to a uniform radius so that the center line of the curved mounting portion of pin defines a plane (referred to as the center plane of the mounting pin). The center plane of all mounting pins, for the present invention are arranged such that the center planes of all mounting pins intersect, preferably at or at least in the proximity of the axis of rotation of the hub. Thus, when viewed from the side, the cutting edges of the blades in a stack still form a cutting profile having a convex shape, but in addition the cutting profile, when viewed along the axis of rotation of the hub, conforms more closely to a true or constant radius, so as to reduce any deviation from concentricity, when compared to prior art convex hubs where the blades are mounted parallel to one another.

Further, it will be recalled that each blade has cutting teeth arranged to be offset laterally in alternate directions relative to the base plate of the rasp blade, each cutting edge being straight. Each blade of the present invention has two mounting apertures. The mounting apertures in each blade are elongated and slightly oversized relative to the diameter of the mounting pins. This permits the blades to be set at an angle relative to a perpendicular (or radial) plane to achieve a desired cut angle, while adjusting to the variations in position required due to the arrangement wherein the center planes of the curved mounting pins intersect, preferably, in proximity to the axis of rotation of the hub.

Further, the present invention provides for a more uniform location of all blades in all stacks relative to the axis of rotation by providing in each blade, that the innermost edge of each oblong mounting aperture is generally straight and extends tangentially to a circle centered on the axis of rotation. This tangential edge forms a locating edge for the blade under centrifugal force, and provides a more precise positioning of the blades, even though the contact point between the locating edge of the mounting aperture and the mounting pin changes for adjacent blades due to the curvature and angled positioning of the mounting pins, and the placement of the blades at different lengthwise locations along the curved central portion of the mounting pins. By this means, as the hub is rotated at cutting speed, centrifugal force urges the blades to edge outwardly. However, the precision locating inner edges of the mounting apertures of the blade engages, and is limited by the mounting pin of the hub which limits this radial outward migration of the blade caused by centrifugal force and accurately locates each blade in the desired location relative to the other blades, and precisely sets the cutting edge for ill blades in a section or stack which is repeated stack-to-stack.

Moreover, the cutting edges have a more accurate location relative to a cut profile of uniform radius. That is, the small cutting edges of all blades, whether in the center of the stack or on the side, are more uniformly aligned with the curvature of the desired cut profile.

In a six-section hub/blade configuration, i.e., a section having a 60° included angle, the apertures are preferably separated such that more than 50% of the mass of the blade is located between the mounting apertures. Thus, centrifugal force tends to center the blade on the angled oblong mounting apertures.

Further, in regard to the hub design—in particular, the blade inclination relative to a plane perpendicular to the axis of rotation of the hub—one embodiment of the invention combines the previous "sawtooth" configuration for some adjacent stacks, with at least one "chevron" arrangement provided by two adjacent stacks, thereby providing both a rapid rate of material removal and improved surface texture.

Persons skilled in the art will appreciate further features and advantages of the present invention from the following detailed description of the illustrated embodiments, accompanied by the attached drawing wherein identical reference numerals will refer to like parts in the various views.

DETAILED DESCRIPTION OF THE ILLUSTRATED EMBODIMENT

Reference numeral 10 generally designates a hub for use in retreading tires. The hub 10 includes first and second end plates 11, 12 (FIG. 3), sometimes referred to as mounting plates. The mounting plates 11, 12 are sometimes referred to, by convention, as the pinside and top side mounting plates. This convention derives from the fact that typically a retreading hub is mounted for rotation about a vertical axis, whereas, in FIGS. 1 and 3, the axis of the hub (indicated by the chain line 13 in FIG. 2) is horizontal. The pins are pressed into the pinside mounting plate and slidably received in the topside mounting plate to facilitate blade replacement.

The hub plate 11 includes a circumferential flange 19 which is divided into a series of sections extending circumferentially about the periphery of the hub, each corresponding to a stack or section of blades. In the illustrated embodiment of FIGS. 1-3, there are five such peripheral segments, designated respectively 20, 21, 22, 23 and 24, proceeding clockwise about the center (or axis of rotation 13) of the hub as viewed in FIG. 1. Each of the sections 20-24 is associated with a number of rasp blades (e.g. ten) and spacers assembled into a "stack". One such stack is generally designated 25 in FIGS. 1 and 3. It will be observed, that only a single stack 25 is shown in FIG. 1, but, as indicated above, when the hub is completed and prepared for use, it would include five separate stacks so that blades would extend completely about the periphery of the hub.

Figure 1:
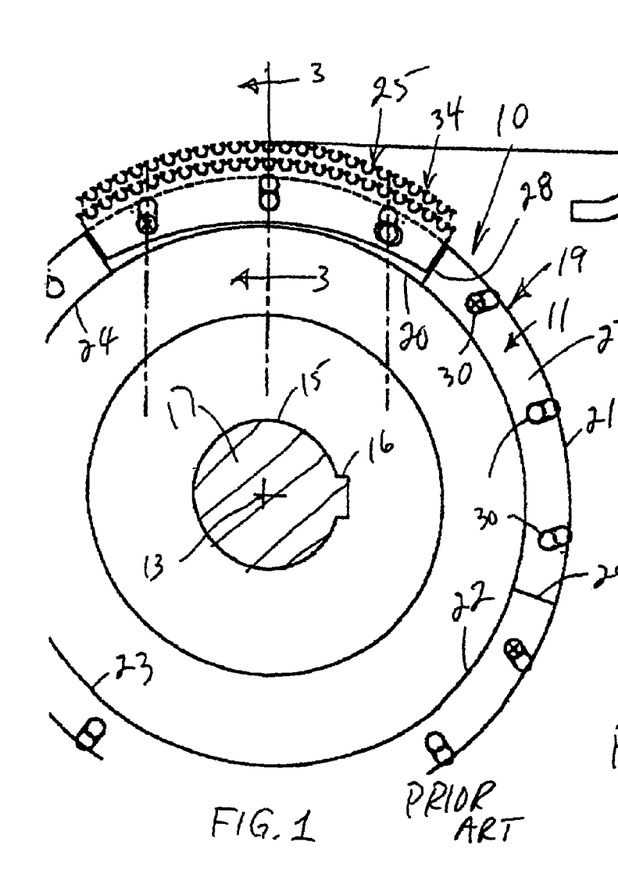
FIG. 1 is a transverse cross sectional view of a rasp hub according to the prior art, showing the pinside mounting plate.

Moreover, for each section of the peripheral flange 19 which is associated with a stack of blades, there is an adjacent mounting surface such as that shown at 27 in FIG. 1 for the peripheral section 21 of the flange 11.

As is known in the art, it is desirable that each blade be mounted at a slight offset (of the order of 4-5 degrees) from a plane perpendicular to the axis of rotation (which is, it will be observed, the plane of the page of FIG. 1). Thus, in FIG. 1, assuming that the hub is to be rotated in a clockwise direction as viewed in FIG. 1, the mounting surface 27 would be inclined relative to the plane of the page or a plane perpendicular to the axis of rotation of the hub. In other words, when proceeding clockwise from a first end 28 which may be relatively far from the viewer to a second end 29 which would be relatively close to the viewer such that if viewed from a two o'clock position as seen in FIG. 1, the mounting surface 27 would rise from right (end 28) to left (end 29) of the viewer. The angle of the blades thus mounted on the surface 27 define an angle relative to a plane perpendicular to the axis of rotation which is sometimes referred to as a "cut angle" such that a swath of material treated by the blade has a greater width than the width of the blade itself, due to the inclination or cut angle of the blade.

Each section of the peripheral flange 19 of the mounting plate 11 (the same being true for the other mounting plate) is provided, in this embodiment, with three apertures 30, each receiving a curved mounting pin 31 for receiving and securing a stack of blades.

Figure 3:
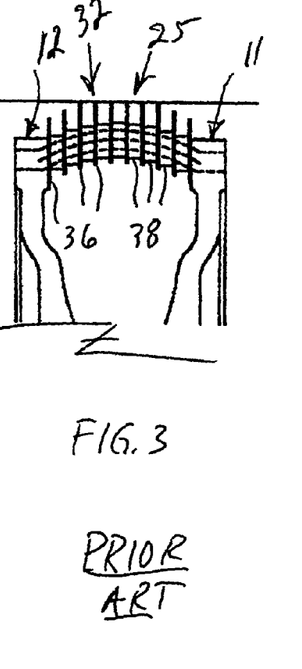
FIG. 3 is a fragmentary right side view of the hub of FIG. 1, including both end mounting plates and a full set of rasp blades, showing only the top portion of the hub.

Referring now to FIG. 3, the blades of the illustrated embodiment are arranged in what is commonly referred to as a "convex" configuration. The term "convex" has reference to the fact that an axial cross section of a given section of blades (a section of mounted blades in FIG. 3 being generally designated by reference numeral 32) has a general convex shape. That is, in transverse section (FIG. 3) the cutting edges of blades toward the center of the stack are relatively more distant from the axis of rotation whereas the outer cutting edges of the blades proceeding from the center of the stack toward the mounting plates 11, 12, are located progressively closer toward the center of the stack. It is the outer edges of the blades, of course, which define the cutting surfaces, one such outer edge being shown at 34 in FIG. 1, for one blade shown in the stack 25. The shape of the profile of the cutting edges of all sections of blades, when rotated, define the cut profile, which will have a corresponding convex shape.

Referring to FIG. 3, the stack 25 includes ten blades 36, each of which may be identical, and arranged in side-by-side parallel relation, and separated by spacers 38, all mounted on the mounting pins 31. Thus, a complete stack of blades and spacers is shown in FIG. 3, secured between the mounting plates 11, 12. The mounting plates are secured in a manner known in the art. Briefly, the shaft 17, which is driven by an electric motor, extends downwardly through the mounting plate 12 and corresponding aperture in the mounting plate 11, and then a nut is tightened onto a threaded distal end of the mounting shaft to secure the two mounting plates and their associated stacks of blades/spacers together.

Figure 2:
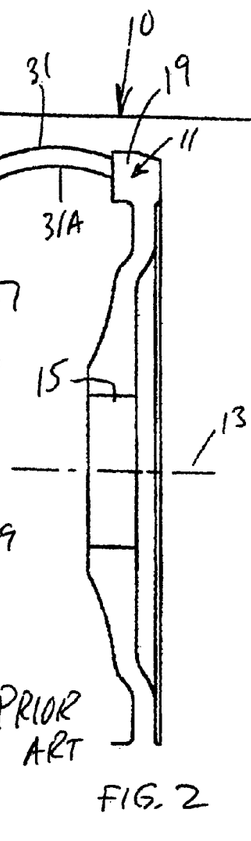
FIG. 2 is a side (i.e., radial) view of FIG. 1, showing only the uppermost curved mounting pin for clarity and without rasp blades.

As seen in FIGS. 2 and 3, the mounting pin 31 includes a curved central portion 31A and straight end portions which are parallel to the axis of rotation 13 and received respectively in apertures in the peripheral flanges of the end mounting plates 11, 12 (the assembly of mounting plates, pin, blades and spacers being shown in FIG. 3). Typically, referring to FIG. 3, the right side (the lower side in normal use) mounting plate 11 has its associated pins pressed into receiving apertures, whereas the top side mounting plate 12 has a clearance fit in receiving its associated pin. This permits a hub to be disassembled and replacement blade stacks inserted for the worn blades.

Figure 4A:
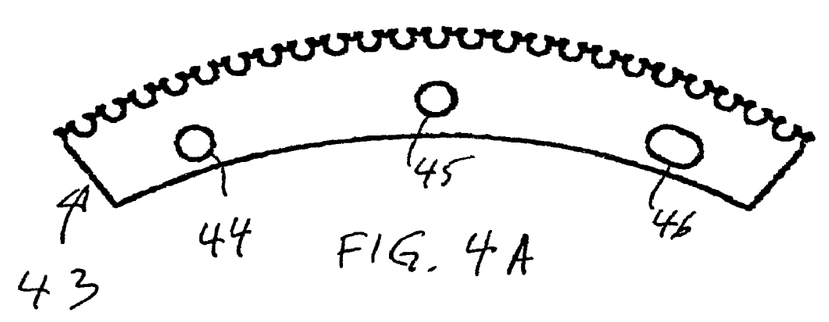
FIG. 4A is a side view (radial of the complete hub) of a conventional rasp blade of the type used in a prior art rasp having five stacks mounting peripherally about the hub.
Figure 4B:
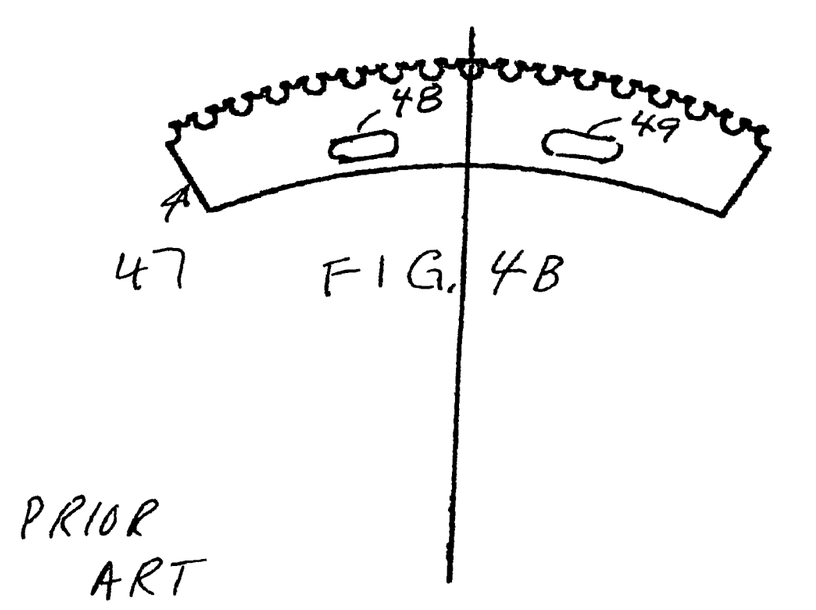
FIG. 4B is a side view of a prior art rasp blade for use in a hub having six stacks of blades mounted peripherally about the hub.

Turning now to FIGS. 4A and 4B, the blade in FIG. 4A, designated 43 has three mounting apertures to receive three separate pins 31, these mounting apertures being designated 44, 45 and 46. It will be observed that the apertures 44 and 45 are circular so that they receive their associated pin and cooperate to limit any circumferential motion of the blade, whereas the mounting aperture 46 is elongated in a circumferential direction to facilitate mounting.

The blade 44 of FIG. 4B has two elongated mounting apertures 48 and 49, according to convention.

The blade of FIG. 4A illustrates a typical blade of the type used in a hub having five sections, such that each blade extends circumferentially about a sector of approximately 72°, whereas the blade 47, which is intended to be mounted in a hub having a six blade section, extends for approximately 60° in a circumferential direction about the hub. These extension angles are approximate because the blades are inclined to form the cut angle, as mentioned, and therefore shortened slightly.

Figure 5A:
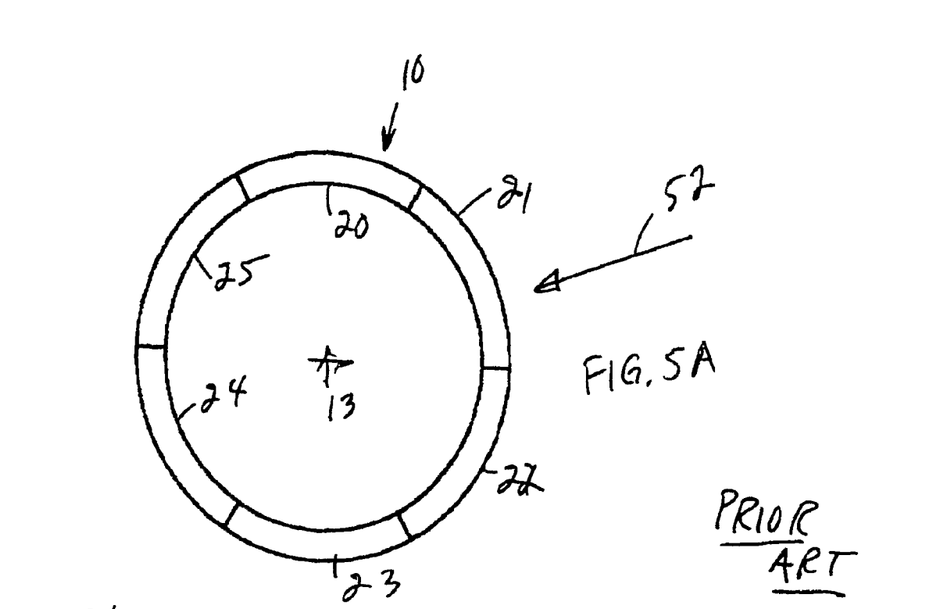
FIGS. 5A-5C are diagrammatic views illustrating conventional stack arrangements for mounting stacks of blades in "sawtooth" and "chevron" configurations, respectively.
Figures 5B, 5C:
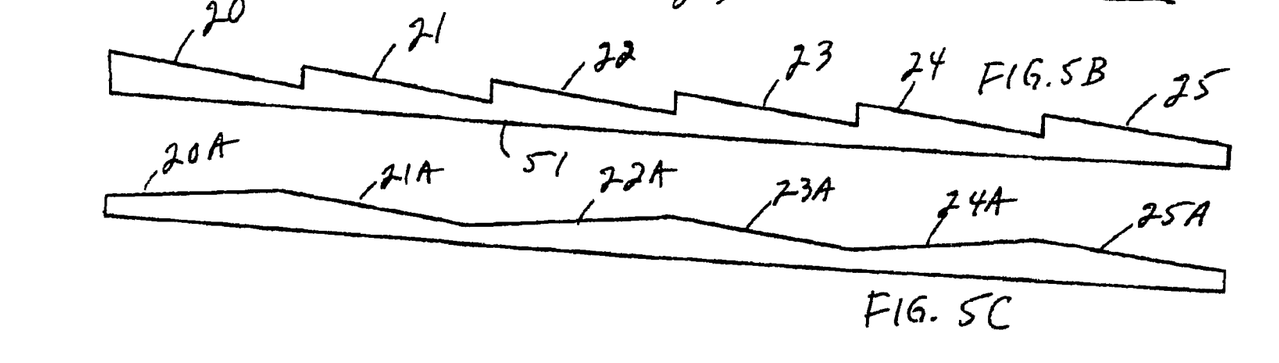

Turning now to FIGS. 5A-5C, a prior art hub 10 is shown more diagrammatically as a six-section hub. Again, the sections, proceeding in a clockwise direction designated respectively 20-25.

If one were to take the hub of FIG. 5A, and open the peripheral flange at the intersection of mounting sections 20, 25 and arrange them to be aligned as seen in FIG. 5B, and then look in the direction of the radial arrow 52 in FIG. 5A, one would see an outline of the plate mounting surfaces 20-25 as seen in FIG. 5B. Specifically, these surfaces would appear to have a sawtooth shape, and the angle of each of the surfaces 20-25 relative to a plane perpendicular to the axis of rotation (designated by reference numeral 51 in FIG. 5B) would define the cut angle of the blade.

An alternative prior art method of mounting the blades is illustrated diagrammatically in FIG. 5C. Such an arrangement is formed by having the even-numbered mounting surfaces for the stacks 20, 22, and 24 extend further away from the observer proceeding in a clockwise direction about the axis of rotation (as indicated by the sections designated 21A, 23A and 25A in FIG. 5C, and by arranging the even sections (20A, 22A and 24A) extending toward the observer when proceeding clockwise about the periphery of the hub, thus forming a series of alternating peaks and valleys as seen in FIG. 5A, and herein referred to as a "chevron" configuration of blades. It will be observed that the chevron configuration of blades can be formed only with an even number of blades.

It is generally known that the "sawtooth" arrangement of stacks, as seen in FIG. 5B, provides a more aggressive cutting action. That is, more material is cut away from the surface to be retreaded in a shorter period of time with the configuration of stacks diagrammatically illustrated in FIG. 5B. The advantage to the "chevron" arrangement is that a better texture of the tread-mounting surfaces provided. This is an important consideration in achieving reliable retreads.

Figures 6A, 6B:
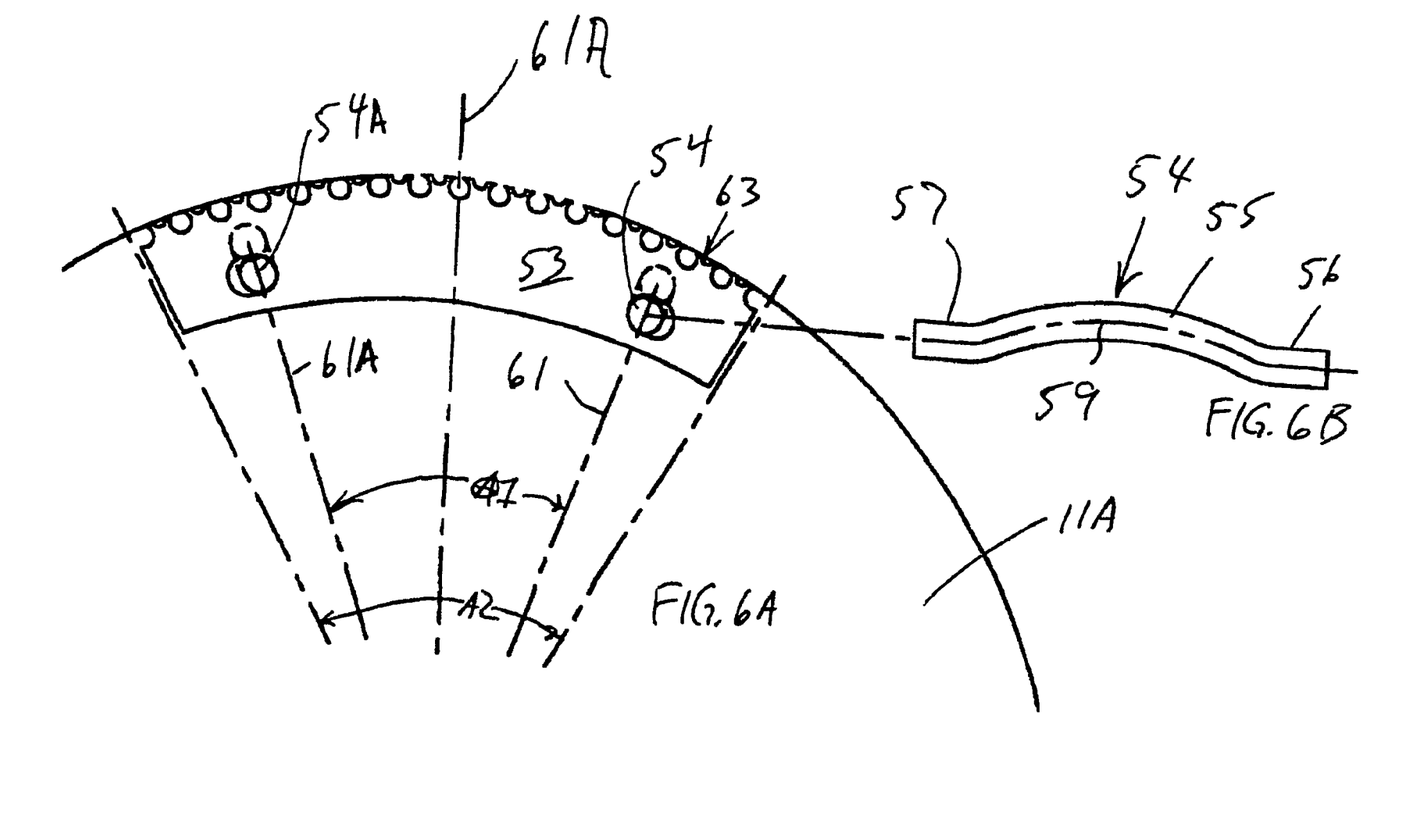
FIG. 6A is a fragmentary transverse cross sectional view of a rasp hub having six stacks of blades and constructed according to the present invention.
FIG. 6B shows a side view of a mounting pin.
Figure 7:
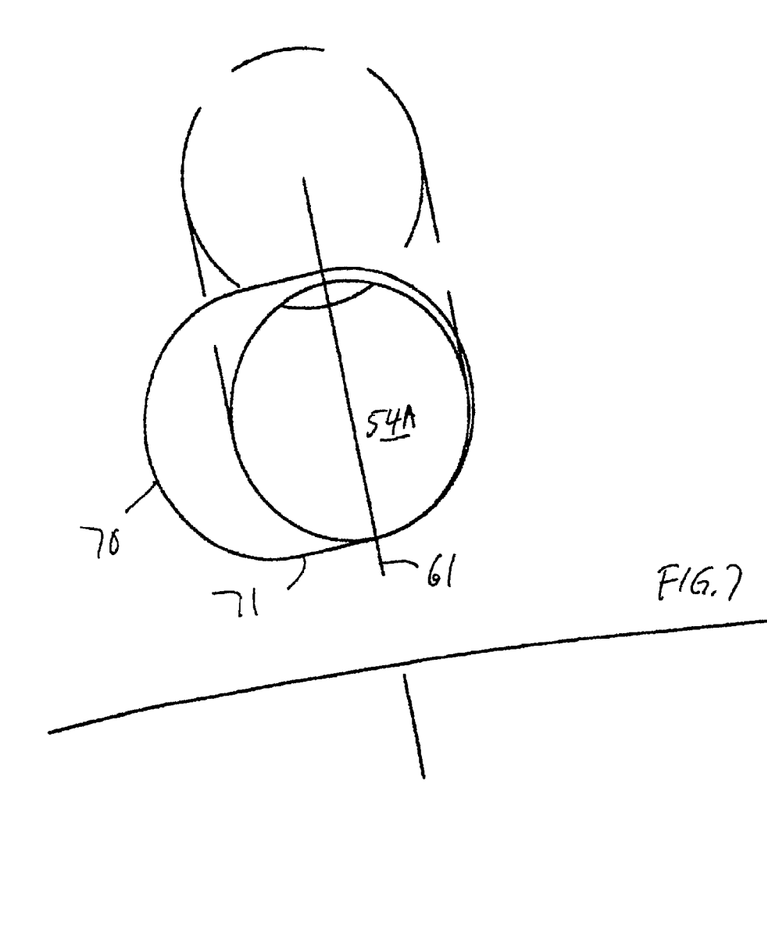
FIG. 7 is a close-up cross sectional view illustrating the mounting of a blade on a curved mounting pin according to the present invention.

Turning now to FIGS. 6A, 6B and 7, a mounting plate 11A, which may be identical to the previously described pinside mounting plate 11, includes a plurality of mounting pins 54, two of which are mounted within each section, and each mounting pin, as seen in side view in FIG. 6B, may be identical in structure to the mounting pins of the prior art, described above and shown at 31. That is, each mounting pin 54 includes a curved center section 55, a first, straight end portion 56 adapted to be pressed into a mounting aperture of the peripheral flange of the pinside mounting plate 11A, and a second straight end portion 57 slidably received, and thus removable, into the opposing top side mounting plate 12. The central curved portion 55 of the mounting pin 54, represented by the center portion of the chained line 59 in FIG. 6B, preferably has a generally constant radius, although this is not necessarily required. It is the curvature of the portion 59 which defines the shape of the convex formation of cutting blades shown in FIG. 3, when viewed radially of the hub, as will be understood.

The center line of the curved pin 54 (which has a generally circular cross section) is illustrated by the chained line 59 defines a plane. The plane formed by the center line of the curved pin lies in the plane of the page of 6B. With respect to FIG. 6A, the plane of the center line 59 of the mounting pin 54 is perpendicular to the plane of the page of FIG. 6 and represented by the chain line 61 in FIG. 6A. When one of the pins 54 is located in the left mounting aperture of the blade 53 of FIG. 6A, the plane of the center line 61A is also shown, and it will be observed that the two center lines 61, 61A will ultimately intersect. Preferably the planes of the center lines of the mounting pins 54 intersect at a location close to the axis of rotation of the hub. By "close", it is meant that the intersection of the planes of the center lines of the mounting pin may be about 15% of the radius of the hub. This is in marked contrast from the arrangements of blades in a convex stack constructed according to the prior art as will be discussed. With reference to FIG. 3, it will be observed that the blades 36 are all parallel to one another so that the planes of the corresponding mounting pins 31 in a prior art stack do not intersect.

By arranging the mounting pins such that their respective center planes intersect near the axis of rotation of the hub and, as is known in the prior art, arranging the blades with a predetermined cut angle, it has been found that the curved arc of the cutting edge of each blade identified by reference numeral 63 in FIG. 6A, reduces the deviation of the outer edges of the blade 53 from a desired true circular arc (i.e., deviation in concentricity), for the same size blade and hub of the prior art. And this improvement in matching the cutting edge to a desire curvature is so for all blades so mounted— that is, for blades on the outer edge of a stack, as well as for those in the center of the stack.

That is, when each of the blades of a stack is set at a predetermined cut angle (that is, inclined relative to a plane perpendicular to the axis of rotation, which is the plane of the page of FIG. 6A), the circular arc of the outer cutting edge of the blade deviates from a true circular arc. It is desirable to have the arc of the cutting blade extend along a circular arc centered at the axis of rotation of the hub. However, in order to achieve a desired cut angle, there is some deviation at the outboard ends of each blade in contrast with the center of the blade, indicated by line 61A in FIG. 6A. This deviation is reduced by arranging the plane of the center line 59 (i.e. the center plane) of each of the mounting pins is inclined, as indicated at 61, 61, such that they intersect, preferably as described above, adjacent the axis of rotation of the hub.

Further, The cutting edges of the teeth of the blade are better fit to lie along (that is intersect with) the desired convex cut profile, as viewed radially of the hub as seen in FIG. 3.

Referring to FIG. 7, the aperture in the base plate of each blade for each of the mounting pins is elongated laterally and slightly oversized. Specifically, the aperture 70 for the mounting pin 54A on the left side of FIG. 6A, is elongated in a circumferential direction, and it has a height along a radial line 61 slightly greater than the diameter of the associated pin 54A, allowing for some clearance. Moreover, the mounting aperture 70 has an inboard edge 71 which is a substantially straight line and tangent to an arc centered on the axis of rotation. Still further, it will be seen from FIG. 6A that the centers of the two mounting apertures are separated in a circumferential or angular manner such that the included angle between the center lines of the mounting pins 54, 54A is substantially greater than one-half of the included angle between the outer edges of the blade 53. The first angle is represented as A1 in FIG. 6A, and the second angle is represented as A2 in FIG. 6A. This has the effect, as will be observed from FIG. 6A, that the mass of the blade 53 included within the angle A1 is substantially greater than 50% of the mass of the blade (that is, included within angle A2). Thus, when the hub is rotated, there is a centrifugal force acting on the center mass of the blade 53 which causes it to move outwardly under centrifugal force until the tangential inner edge (sometimes referred to as the locating edge) 71 of a slot engages the inner surface of the mounting pin 54 (this is so, it will be observed, irrespective of the location of any particular blade along the length of the curved portion 55 of the mounting pin 54). This arrangement serves to reliably actuate the blades relative to the axis of rotation of the hub.

Figures 8A, 8B:
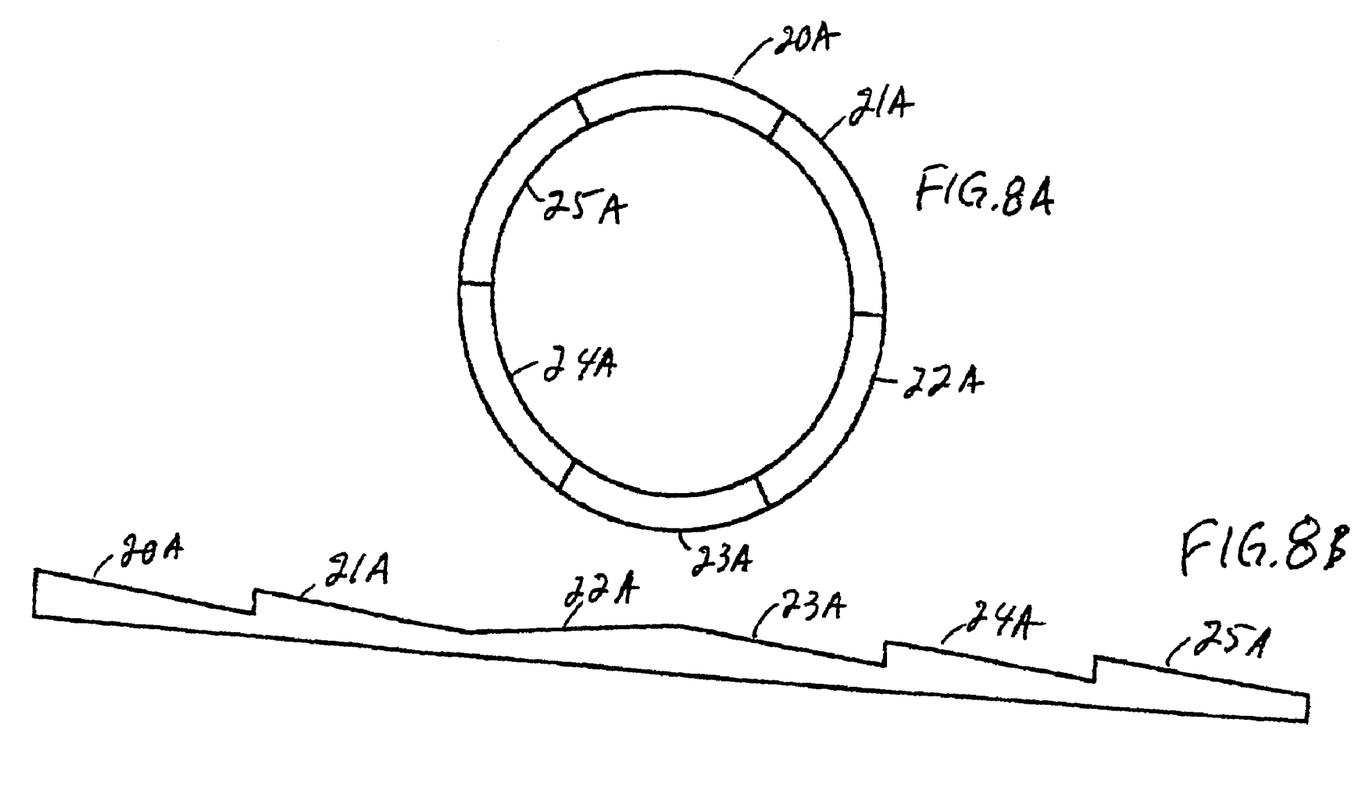
FIGS. 8A and 8B are diagrammatic views showing an arrangement of stacks of blades employing both sawtooth and chevron arrangements, in a single hub.

Turning now to FIGS. 8A and 8B, there is shown another possible embodiment of the invention. In FIG. 8A, the hub is again shown diagrammatically, similar to that shown in FIG. 5A—that is, only the mounting surfaces of the peripheral mounting section of the hub are shown, and these are designated respectively 20A, 21A, 22A, 23A, 24A and 25A, proceeding in a clockwise direction. These hub mounting surfaces are then projected onto a plane after uncoiling the hub at the intersection between sections 20A and 25A and projecting the mounting surfaces onto a plane looking from the upper right hand quadrant, similar to the line of sight designated 52 in FIG. 5A.

The mounting surfaces, as seen in FIG. 8B, include two surfaces 20A, 21A forming a sawtooth configuration. For blade mounting surface 22A, however, when proceeding in a clockwise direction, the mounting surface 22A extends closer to the observer so that the mounting surfaces for the sections 21A, 22A form a chevron shape. Similarly, the mounting surface for the section 23A recedes from the observer into the plane of the page as one proceeds counter-clockwise about the hub, thereby forming a chevron-shaped mounted surface, while the final two mounting surfaces designated respectively 24A and 25A again form a sawtooth configuration. Thus, there is at least one complete chevron arrangement along with remaining sawtooth arrangements in a single configuration. This arrangement does not require an even number of sections, rather, one could eliminate either section 20A or 25A in FIG. 8B and still maintain the combination of at least chevron and at least two sequential sawtooth sections, thereby providing some increased aggressiveness in the removal of material while also some texture-enhancing portion provided by the chevron relationship between adjacent sections.

In summary, in accordance with the present invention, in a rasp hub having a convex configuration of rasp blades, the blades are mounted by mounting pins having curved central sections, and the center planes of the mounting pins are arranged to intersect, preferably near and above a line substantially parallel to the axis of rotation of the hub. The cutting surfaces of the blades, when the hub is viewed from the side, are arranged to form a convex shape, but by thus arranging the planes of curvature of the mounting pins to intersect (preferably adjacent or near the axis of rotation of the hub), the deviation from the desired true radius of the cutting edge of the blade, is reduced when the blades are inclined at a cut angle relative to a plane passing perpendicular to the axis of rotation.

Moreover, each blade has two elongated mounting apertures, slightly oversized relative to the diameter of an associated mounting pin. Each cutting aperture has an inner edge which serves as a locating edge for its associated blade, and the locating edge preferably is arranged in a straight line extending in a tangential direction relative to the rotation of the blade.

Further, the mass of the central solid portion of the blade (that is, between the two elongated mounting apertures) is preferably greater than the mass of the blade remaining on the two distal portions of the blade. This causes a force on the blade which tends to force the blade outwardly so that all the blades achieve a uniform distance from the axis of rotation, and irrespective of the location of the blade along the length of the mounting pin (that is, whether it is in the center of the hub or toward the mounting plates of the hub), the confirmation of the cutting edge of each blade conforms with less deviation to the idealized circular radius of cut.

Finally, in arranging the stacks of blades about the circumference of the hub, the mounting angle of two adjacent stacks are arranged to form a chevron shape whereas the remaining stacks, one relative to one another, form a sawtooth shape, thus providing at least some aggressive cutting action of the blades while improving the overall texture of cut.

Having thus disclosed in detail a number of embodiments of the invention, persons skilled in the art will be able to modify certain of the structure which has been disclosed and to substitute elements for those illustrated while continuing to practice the principle of the invention and it is, therefore, intended that all such modifications and substitutions be covered as they are embraced within the spirit and scope of the appended claims.

I claim:

1. Apparatus for use in retreading tires, comprising:
    a hub including first and second side plates adapted for rotation about an axis;
    a plurality of mounting pins spaced at approximately equal angular spacing about said axis of rotation, each mounting pin having first and second end segments and a curved central segment extending outwardly of said axis of rotation to form a convex hub, said first end segments of each mounting pin fixed to said first side plate, said second ends of each mounting pins coupled to said second side plate;
    a plurality of stacks of rasp blades removably mounted on said mounting pins, said stacks extending end-to-end about said hub;
    each of said mounting pins having a center line defining a center plane, said center planes of said mounting pins intersecting along a line of intersection.

2. The apparatus of claim 1 wherein said blades are curved along the direction of cut and each blade is arranged to be inclined relative to a plane perpendicular to said axis of revolution to form a cut angle.

3. The apparatus of claim 2 wherein said stacks of rasp blades comprise an odd number of stacks arranged circumferentially about said hub and wherein the cutting edges of all blades form parallel planes, thereby forming a sawtooth stack arrangement extending circumferentially entirely about said hub.

4. The apparatus of claim 2 wherein said stacks of rasp blades comprise a first plurality of stacks arranged circumferentially about said hub and having the cutting edges of the blades in said first plurality of stacks form parallel planes to form a sawtooth arrangement of stacks extending circumferentially partially about said hub; and at least two stacks of blades arranged in opposing but equal cut angles to form a chevron arrangement in general circumferential alignment with said first stacks.

5. The apparatus of claim 2 wherein all said center planes of said mounting pins intersect along a common line.

6. The apparatus of claim 5 wherein said common line of intersection of said mounting pins is generally parallel to said axis of rotation.

7. The apparatus of claim 1 wherein said stacks of blades are arranged relative to said first side plate in a sawtooth arrangement wherein blades of each stack define approximately the same cut angle relative to a plane extending perpendicular to said axis of revolution.

8. The apparatus of claim 7 wherein said second ends of said mounting pins are slidably received in openings in said second end plate.

9. The apparatus of claim 1 wherein each of said blades includes a baseplate and a plurality of cutting teeth;
    each base plate including first and second slots for receiving associated mounting pins;
    each slot having a radial width slightly larger than a diameter of said mounting pins; and
    each slot having a generally straight locating edge extending generally in a circumferential direction and defining a radial locating position for said blade when said hub is driven in rotation.

10. The apparatus of claim 9 herein the elongation of each of said mounting slots is greater than a diameter of said mounting pins taken in said curved segment thereof, thereby permitting blades of each stack to accommodate a uniform cut angle while being located at various positions along said curved mounting segment to reduce deviation from concentricity of said blade when viewed along a line parallel to said axis of rotation.

11. The apparatus of claim 10 wherein said locating edge of such slot of a blade is tangential to a circle having its center at said axis of rotation.

12. The apparatus of claim 1 wherein said at least two of said stacks of blades form a chevron arrangement and wherein said mounting aperture of said blades of said at least two stacks have mounting apertures spaced apart circumferentially such that at least one-half of the mass of a blade is located between respective adjacent edges of said mounting apertures.

* * * * *